United States Patent [19]

Walker

[11] 4,008,915
[45] Feb. 22, 1977

[54] IMPACT BARRIER FOR VEHICLES

[75] Inventor: Grant W. Walker, Sacramento, Calif.

[73] Assignee: Dynamics Research and Manufacturing, Inc., Sacramento, Calif.

[22] Filed: June 4, 1975

[21] Appl. No.: 583,683

[52] U.S. Cl. .................. 293/60; 293/1; 293/DIG. 3; 188/1 C; 213/220; 114/219
[51] Int. Cl.² ................................ B60R 19/04
[58] Field of Search .......... 293/1, 60, 71 R, 71 P, 293/DIG. 3, 87, 75–77, 70, 88, 96, 98–99, 16, 41, 63; 188/1 C; 267/139–140; 213/220–221; 114/219

[56] References Cited

UNITED STATES PATENTS

| 1,521,579 | 12/1924 | Freedman | 293/60 |
|---|---|---|---|
| 2,491,128 | 12/1949 | Nelson | 213/221 |
| 3,361,467 | 1/1968 | Ludwikowski | 267/140 X |
| 3,503,600 | 3/1970 | Rich | 293/1 X |
| 3,570,257 | 3/1971 | Walker et al. | 293/1 X |
| 3,614,148 | 10/1971 | Favary | 267/139 X |
| 3,666,055 | 5/1972 | Walker et al. | 188/1 C |
| 3,672,657 | 6/1972 | Young et al. | 293/60 X |
| 3,717,370 | 2/1973 | Walker | 293/71 R X |
| 3,721,433 | 3/1973 | Sobel | 213/221 X |
| 3,876,082 | 4/1975 | Fehl et al. | 213/221 |
| 3,907,353 | 9/1975 | Dinitz | 293/90 X |

FOREIGN PATENTS OR APPLICATIONS

| 1,043,167 | 9/1966 | United Kingdom | 293/71 R |

Primary Examiner—Robert B. Reeves
Assistant Examiner—Charles A. Marmor
Attorney, Agent, or Firm—Lothrop & West

[57] ABSTRACT

An impact barrier designed specially to be installed at the rear of a vehicle such as a truck, has a generally rectangular, stiff enclosure open at the bottom. There is a support connected between the enclosure and the back of the vehicle so that the enclosure projects rearwardly behind the vehicle at about the expected area of impact of a following collision. Within the enclosure is a plurality of energy dissipating elements or cells arranged within the enclosure in substantial abutment with each other and with the enclosure sides. The dissipating elements are individually made of a frangible or powdering material. The enclosure support preferably includes a snubber for damping out vertical oscillations in the device.

6 Claims, 5 Drawing Figures

U.S. Patent    Feb. 22, 1977    4,008,915
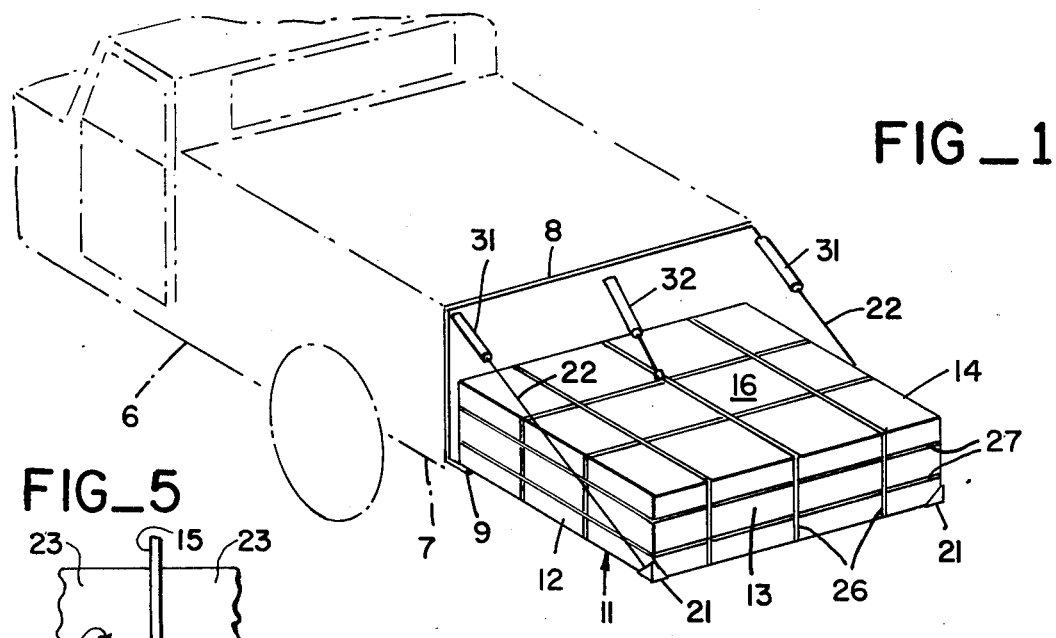
FIG_1
FIG_5
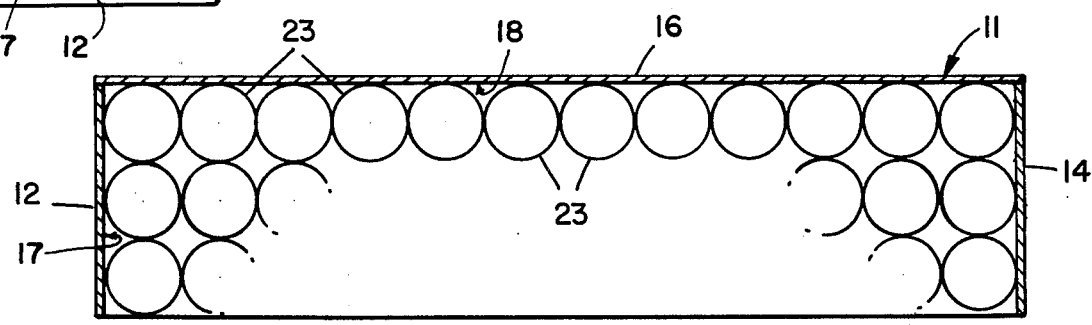
FIG_2
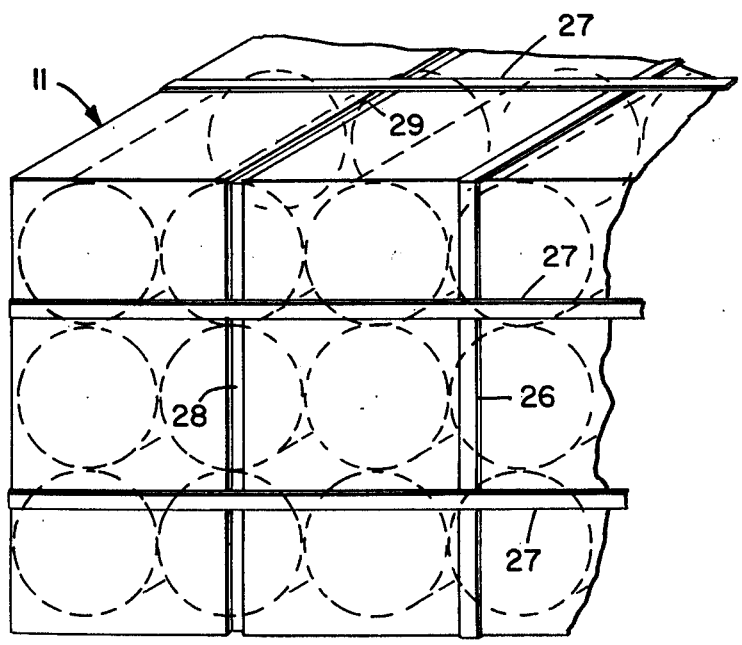
FIG_3
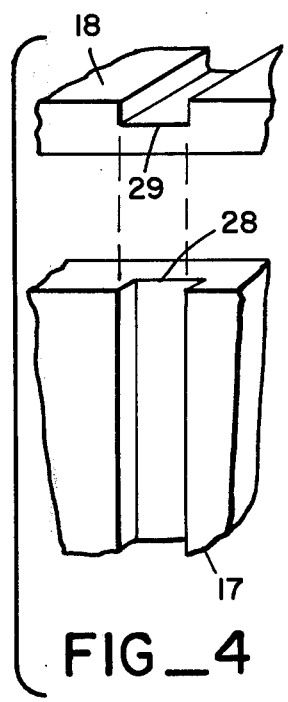
FIG_4

IMPACT BARRIER FOR VEHICLES

In connection with some road vehicles, particularly emergency vehicles which must patrol highways and bridges for maintenance and surveillance reasons, it is not uncommon, even though such vehicles are painted in highly visible colors, are provided with extra lighting and carry various warning devices, that during patrol they are subject to collision or impact from behind by overtaking vehicles. Under such circumstances it has been found that the customary bumpers normally furnished with such vehicles as standard are not nearly effective enough. Sometimes such vehicles are largely destroyed and the users of them are severely injured.

It is therefore an object of this invention to provide an impact barrier for a vehicle of a capacity to protect the vehicle and its occupants despite such rear-end collision.

Another object of the invention is to provide an impact barrier that is made up of a number of readily available, readily replaceable and economical units so that after an impact or collision the barrier can readily and cheaply be reconstituted for subsequent use.

A further object of the invention is to provide an impact barrier arranged in such a way as to project an extra large distance behind the carrying vehicle and which is provided with means for supporting the projecting barrier in such a fashion as not to disturb the normal balance of the vehicle and not to excite undue vibrations therein.

Another object of the invention is to provide a substantially self-contained impact barrier which can readily be attached to existing vehicles without difficulty.

Another object of the invention is to provide an impact barrier that conforms generally to accepted standards for highway utilization on vehicles.

A further object of the invention is to provide an impact barrier that in general affords substantially increased protection to vehicles, such as maintenance vehicles, which must necessarily travel slowly on a highway.

Other objects, together with the foregoing, are attained in the embodiment of the invention described in the accompanying description and illustrated in the accompanying drawings, in which:

FIG. 1 is a perspective view showing a maintenance vehicle with the impact barrier of the invention secured thereto, the vehicle being illustrated in broken lines;

FIG. 2 is a cross-section through the impact barrier, the plane of section being vertical and transverse;

FIG. 3 is an isometric view of a portion of the impact barrier showing some of the interior and exterior construction in detail;

FIG. 4 is a fragmentary view in isometric perspective showing details of the top and side construction; and FIG. 5 is a fragmentary view in plan of a portion of the impact barrier with the top panels omitted and showing a diaphragm wall.

In one practical form of the arrangement the application is to an emergency vehicle 6, for example, of a sort which patrols highway or bridge lanes slowly during traffic times. The vehicle has the usual characteristics including a rear body 7 to which the impact barrier is secured. The barrier itself or the body has a support frame 8 that is fastened to or is a part of the general frame structure of the vehicle. From the support frame 8 there projects a ledge 9 underlying and partly supporting an enclosure 11 having at least three sides 12, 13 and 14 and a top 16. Usually a bottom is omitted, and, depending upon the nature of the frame 8, the fourth side can likewise be omitted, particularly if the frame 8 is solid.

The enclosure is made up of individual side panels 17 (FIG. 4) extending generally vertical and fabricated of plywood or the like and includes also top panels 18 similarly fabricated. The enclosure thus formed is also supported on corner brackets or ledges 21 in turn secured by cables 22 to the frame 8. The entire enclosure is simply supported on the rear of the vehicle. The enclosure is wide enough and high enough to occupy most of the space across the vehicle body and extends an unusually long distance behind the vehicle, a matter of several feet usually.

Accommodated within the enclosure is a number of individual cells or bodies 23 of the sort shown in the U.S. Pat. to Grant W. Walker, No. 3,666,055, issued May 30, 1972, entitled Energy Absorbing Device and disclosing a generally cylindrical body of a cement-like, vermiculite material formed with a hollow center and carrying an extended helical wire winding. Such a body upon impact loses its solid character and fractures or powders, thus transferring and dissipating a great deal of the impact energy. The same sort of body or cell is utilized herein. The arrangement of the bodies or cells is such that they can receive impact from virtually any direction but particularly from the rear and when they shatter in a collision dissipate by falling downwardly through the open bottom of the enclosure.

In the fabrication of the unit the enclosure 11 is preferably built around a geometric stack of cells or bodies 23 on some sort of a temporary support. Transverse diaphragm walls 15 can be disposed between the energy dissipating cells 23 or elements. When the enclosure panels 17 and 18 have been assembled around and over the stacked bodies, they are secured together by surrounding binding straps 26 and 27 lying in grooves 28 and 29 in the respective panels. When the straps are tightened the contents of the enclosure are retained under some compression, sufficient to hold the cells in position despite the absence of a bottom from the enclosure and so that they can be carried indefinitely at the rear of the vehicle. The enclosure unit is readily and inexpensively made in this fashion, the panels being discardable if injured, and can easily be positioned on the vehicle after it has been assembled.

It has been found that the extra extension rearwardly or overhanging weight tends to cause some undue vibrations or undulatory movement not only of the enclosure and its contents but also sometimes of the vehicle. To prevent resonance and to damp out some of the unwanted undulations the enclosure is somewhat loosely mounted on the ledge 9 so that its own oscillations need not be transmitted to the body 7 and vice versa, and also the cables 22 are provided with shock absorbers 31. These affod or allow some limited but damped vertical oscillation of the enclosure relative to the back of the frame. In lieu thereof or in addition thereto, there is provided a snubber 32 in the nature of a hydraulic cylinder at one end secured to the frame 8 and at the other end having a piston rod or plunger bearing upon or secured to the top 16 of the enclosure. When either or both of these devices are utilized, separate movement of the enclosure is permitted but within restricted limits. Vehicle body and enclosure oscillations tend to oppose rather than to reinforce each other.

In practice the amount of energy-converting material in the numerous cells in the impact barrier is sufficient and there is sufficient longitudinal distance for multiple cell crushing so that an overtaking vehicle slamming into the rear of the vehicle 6 is itself decelerated and the vehicle 6 is not materially harmed. This is true even though the vehicle 6 is stopped with its brakes set or is proceeding very slowly. The collision energy is dissipated by disruption of the bodies or cells 23 to an extent so that shock of the overtaking vehicle and on the vehicle 6 is largely dissipated and usually is non-destructive. The impact has only acceptable effects upon both vehicles and their occupants.

The cells are disintegrated and the container may be destroyed but both are relatively cheap and can be easily removed and economically replaced. Usually the vehicle 6 can still be driven after impact and can quickly be reequipped with another impact barrier.

What is claimed is:

1. An impact barrier for vehicles comprising a generally rectangular enclosure open at the bottom and including side walls relatively movable toward each other, means for securing said enclosure to the back of a vehicle in a position projecting rearwardly therefrom, a plurality of substantially solid energy dissipating elements arranged within said enclosure, and means engaging said side walls for forcing said side walls toward each other and into substantial compressive supporting abutment with said elements.

2. An impact barrier as in claim 1 in which said enclosure side walls are generally planar, upright and horizontally movable relative to each other; and said engaging means is a surrounding tension strap urging said side walls horizontally toward each other and against said elements and urging said elements against each other.

3. An impact barrier as in claim 1 in which said elements are of circular-cylindrical shape having a central axis, and said elements are disposed with the axes thereof arranged horizontally and extending in a fore-and-aft direction.

4. An impact barrier as in claim 3 in which at least some of said elements are arranged with said axes in alignment, and transverse diaphragm walls disposed between said elements so arranged.

5. An impact barrier as in claim 1 including a motion snubber interconnected between said securing means and said enclosure.

6. An impact barrier as in claim 2 in which said side walls are provided with grooves.

* * * * *